(12) United States Patent  (10) Patent No.: US 7,594,567 B2
Sabelstrom et al.  (45) Date of Patent: Sep. 29, 2009

(54) PROTECTION SHIELD FOR DISK BRAKE

(75) Inventors: Mats Sabelstrom, Billdal (SE); Lars Bagge, Gothenburg (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 10/711,088

(22) Filed: Aug. 20, 2004

(65) Prior Publication Data

US 2005/0016798 A1 Jan. 27, 2005

Related U.S. Application Data

(63) Continuation of application No. PCT/SE03/00270, filed on Feb. 19, 2003.

(30) Foreign Application Priority Data

Feb. 20, 2002 (SE) .................................. 0200493

(51) Int. Cl.
*F16D 65/10* (2006.01)

(52) U.S. Cl. ..................... 188/218 A; 188/264 AA; 188/71.6; 301/6.3

(58) Field of Classification Search ............. 188/218 A, 188/218 XL, 71.6, 264 A, 274, 264 AA, 264 R; 192/113.23, 113.26; 301/6.91, 6.1, 6.8, 6.3, 301/6.4; 280/159, 157, 152.3, 847
See application file for complete search history.

(56) References Cited

U.S. PATENT DOCUMENTS

| 4,226,308 A | 10/1980 | Nishiyama et al. | |
| 4,593,953 A * | 6/1986 | Baba et al. | ............ 301/6.3 |
| 6,155,650 A * | 12/2000 | Barger | ............ 301/6.3 |

FOREIGN PATENT DOCUMENTS

| DE | 3446058 | * | 6/1986 |
| DE | 3816415 | * | 11/1989 |
| DE | 4243988 | * | 6/1994 |
| DE | 4344051 | A1 | 7/1994 |
| EP | 0204433 | A1 | 12/1986 |

(Continued)

OTHER PUBLICATIONS

International Search Report dated May 9, 2003 from the International Application PCT/SE03/00270.

*Primary Examiner*—Robert A Siconolfi
*Assistant Examiner*—Mariano Sy
(74) *Attorney, Agent, or Firm*—Novak Druce + Quigg, LLP

(57) ABSTRACT

A protection device (10) in a disk brake arrangement for protecting a brake disk (12) from dirt particles. The protection device at least partly surrounds the brake disk (12), and the protection device (10) includes at least one protection assembly (13) that is mounted on the wheel suspension (11) and consists at least partly of a material of which the shape is influenced by heat. The protection assembly has a first end position which prevents dirt particles and relative wind from striking the brake disk directly and a second end position which allows relative wind to strike the brake disk directly so as thus to obtain cooling of the brake disk. The first end position occurs when the temperature of the protection assembly lies below a first temperature and the second end position occurs when the temperature of the protection assembly exceeds a second temperature.

2 Claims, 3 Drawing Sheets

FOREIGN PATENT DOCUMENTS

| | | | |
|---|---|---|---|
| GB | 1252389 | * | 11/1971 |
| GB | 2174772 | * | 11/1986 |
| JP | 59-47531 | * | 3/1984 |
| JP | 62-242142 | * | 10/1987 |
| JP | 1-229753 | * | 9/1989 |
| SU | 1218199 | * | 3/1986 |
| WO | WO03/071153 A1 | * | 8/2003 |

* cited by examiner

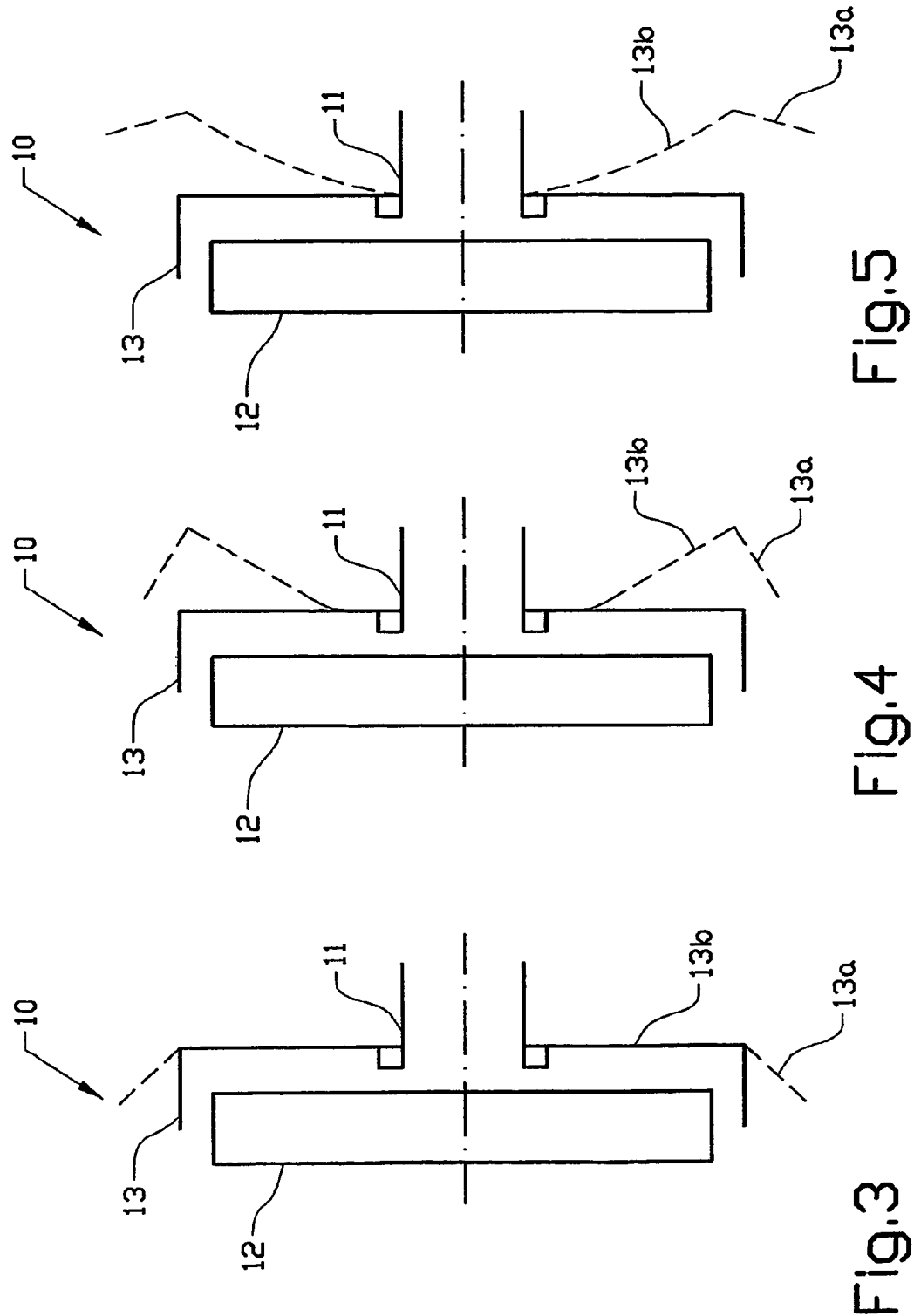

PROTECTION SHIELD FOR DISK BRAKE

CROSS-REFERENCE TO RELATED APPLICATIONS

The present application is a continuation patent application of International Application No. PCT/SE03/00270 filed 19 Feb. 2003 which was published in English pursuant to Article 21(2) of the Patent Cooperation Treaty, and which claims priority to Swedish Application No. 0200493-5 filed 20 Feb. 2002. Said applications are expressly incorporated herein by reference in their entireties.

TECHNICAL FIELD

The present invention relates to a protection device for a disk brake, for protecting the brake disk from dirt particles, where the protection device is provided with at least one openable protection means for admission of heat-dissipating air for cooling the brake disk.

BACKGROUND ART

The functioning of disk brakes is affected negatively by contamination, which can lead to changes in friction, uneven wear and also corrosion on disks and linings. It is known to equip disk brakes with a protection plate so as to avoid contamination spattering directly onto the brake disk. The contamination may consist of, for instance, water contaminated with dust, salt and/or mud. The protection plate can be configured so that it covers the brake disk effectively but, when the brake disk is completely covered, cooling is also impaired. A common compromise between covering and cooling the brake disk is for the protection plate to cover the inside and the periphery of the brake disk. The outer side of the brake disk is partly protected by the wheel rim. The protection plate covers that part of the brake disk which is uncovered; that is to say, the part which is not covered by the brake caliper and brake lining.

Brakes on vehicles such as heavy-duty trucks, exemplarily configured as disk brakes, are sometimes subjected to very high power dissipation. In this connection, problems can arise if brake disks do not receive sufficient cooling. It has been found that the power dissipation is usually quite low at low speed. In many cases, low speed is due to a poor road standard, for example in the case of transporting lumber on forest roads, the road environment usually being very dirty as well. Construction vehicles also are driven at low speed when the environment is dirty, for example in the case of road construction. In this connection, it is desirable for the protection against dirt to have maximum effectiveness when the vehicle is driven at low speed.

On good roads, the speed is normally considerably higher, with an increased requirement for high braking effect. In this connection, it is desirable for the cooling to have maximum effectiveness. These varying requirements can be satisfied by a mechanical device which can adjust a damper or the like which adapts the admission of cooling air to the brake according to the current need. It is necessary, however, that such devices cannot be put out of operation, which in turn could lead to impaired braking effect; that is to say, the overall safety of the vehicle being put at risk.

Such a device adapted for motorcycles is known, for example, from JP05060158, which discloses a protection plate for a disk brake. In this example, a damper plate is displaceable along the outer edge of the protection plate being maneuverable by means of a piston cylinder for exposing a number of hole openings. This known solution is complicated and sensitive to contamination, for which reason it is not a realistic possibility for application to heavy-duty trucks, which are expected to cope with service intervals of roughly 50,000 km. Such a configuration, however, would be a prohibitively expensive solution for a truck which has at least four brake disks. Moreover, the solution is intended primarily for a brake disk which is covered on both sides, which is the case on motorcycles.

DISCLOSURE

One object of the invention is to produce a protection device that meets the requirements indicated above and at the same time is simple, reliable and affordable.

To this end, a protection device configured according to the teaching of the present invention is characterized in that the protection device comprises at least one protection means (protector or shield) which consists at least partly of a material of which the shape is influenced by heat. The protection means has a first end position that effectively prevents (not necessarily absolutely prevents, but precludes at least a sufficient amount to avoid degradation) dirt particles and relative wind from striking the brake disk directly. A second end position allows relative wind to strike the brake disk directly so as to obtain cooling of the brake disk. The first end position occurs when the temperature of the protection means lies below a first temperature and the second end position occurs when the temperature of the protection means exceeds a second temperature. By virtue of this design of the protection device, advantageously simple and effective self-adjusting opening and closing of one or more ventilation openings at the brake disk are obtained.

In a first advantageous illustrative embodiment of the invention, the protection means changes shape continuously from the first end position to the second end position. By virtue of this design of the protection device, stepless adjustment of the cooling of the brake disk is obtained.

In a second advantageous illustrative embodiment of the invention, the protection means changes shape stepwise from the first end position to the second end position. By virtue of this design of the protection device, a rapid increase in the cooling of the brake disk is obtained when a given temperature has been reached.

In a third advantageous illustrative embodiment of the invention, the protection means is arranged so as to react to heat radiation from the brake disk. By virtue of this design of the protection device, an increase in the cooling of the brake disk is obtained when the brake disk becomes hot.

In a fourth advantageous illustrative embodiment of the invention, the protection means is L-shaped. By virtue of this design of the protection device, a protection shield which also covers the periphery of the brake disk is obtained.

In a fifth advantageous illustrative embodiment of the invention, the heat-influencable material consists at least partly of a bimetal. By virtue of this design of the protection device, a protection shield which opens and closes the air supply for cooling a brake disk is obtained in a simple and inexpensive manner.

DESCRIPTION OF DRAWINGS

The invention will be described in greater detail below with reference to illustrative embodiments shown in the accompanying drawings, in which:

FIGS. 3-5 are cross-sectional views, each taken along the line A-A in FIG. 2 and which exhibit three different variants of illustrative embodiments of the invention shown in FIG. 2.

MODE FOR INVENTION

The protection device 10 shown in the figures is intended to be mounted on the wheel suspension 11, suitably at each of the wheels on a vehicle. The aim is to protect the brake disks 12 of the vehicle as well as possible from contact with degrading contamination, usually taking the form of dirt particles.

Figure 1:
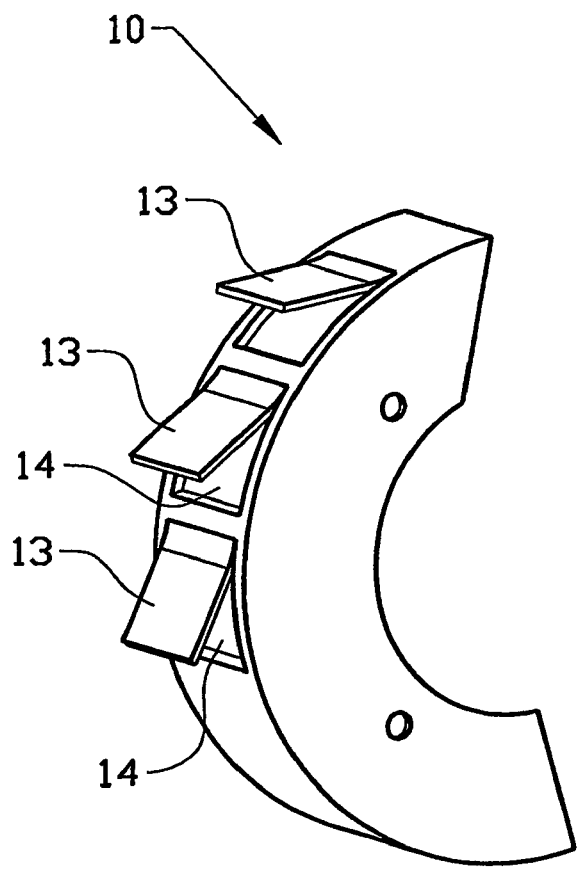
FIG. 1 is a partial perspective view of a protection device configured according to a first illustrative embodiment of the invention.

In the illustrative embodiment configured according to FIG. 1, the protection device forms a shield which is angled in an L-shaped manner around the edge of the brake disk 12. The shield is made from a material of which the shape is influenced by heat, preferably a bimetal sheet metal. A number of U-shaped punchings are made in the sheet metal, along the outer, peripheral portion of the shield. In this way, individual tongues 13 have been formed, which are arranged so as to be bent radially outward under the influence of heat. When the tongues 13 are bent outward, openings 14 are formed, which make it possible for cooling air to move past the shield and transport heat away from the brake disk 12. Tongues made of bimetal plate can also be attached to a shield made from ordinary sheet metal, for example by riveting.

It is also possible for the shield to cover the brake disk on both sides; that is to say, that the shield is angled in a U-shaped manner around the edge of the brake disk 12. This enhances the dirt-protection characteristics of the shield. With an effective design of the tongues and openings of the protection shield, this can be done without the cooling of the brake disk being impaired. It is of course also possible to locate tongues on the side or sides of the shield.

The protection device is intended to protect the brake disk against dirt spatter when the temperature of the brake disk is low; that is to say, when the braking effect requirement is low. A suitable temperature at which the protection device is to begin to open may be, for example, when the temperature of the brake disk is around 200 degrees C. Depending on the design of the protection device, for example the spacing between the protection device and the brake disk, the heat-influencing material is adapted so that the protection device begins to open at the desired temperature. When the brake disk has reached a temperature in the range 250-300 degrees C., the protection device should be completely open. In one embodiment, two different heat-influencing materials can be combined so that one material opens at a lower temperature so as to provide a certain cooling and another material opens at a higher temperature so as to provide maximum cooling.

Figure 2:
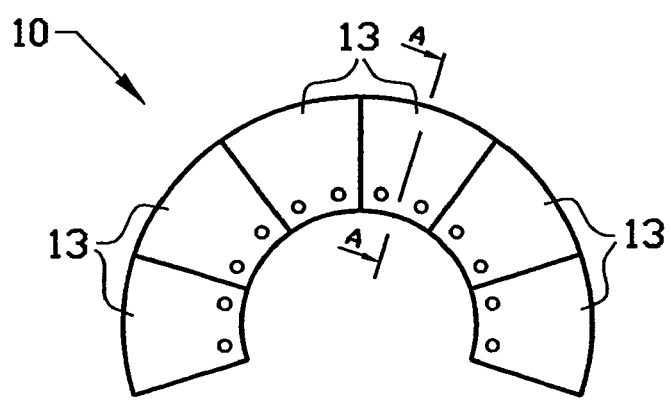
FIG. 2 is a top plan view of a protection device configured according to a second illustrative embodiment of the invention.

FIG. 2 shows an illustrative embodiment of the invention where the protection device comprises a number of separate tongues 13 arranged in series next to one another. These tongues are arranged radially with a radially inner end connected to the wheel suspension 11 of a vehicle, as can be seen from FIGS. 3-6, which also show that the tongues are angled in an L-shaped manner around the edge of the brake disk 12. The tongues 13 can cover the edge of the brake disk completely or partly. The protection device is intended to cover that part of the brake disk which is not covered by the brake caliper and brake lining.

In the variant according to FIG. 3, the heat-influencable material has been located in the angle between the two legs 13a, 13b of the tongues concerned. In this connection, the leg 13a can swing away from the brake disk 12 when the material reacts to heat radiation from the disk. The opening then formed can be seen as a sector-shaped arc portion which makes it possible for relative wind to strike the brake disk for cooling.

In the variant according to FIG. 4, the heat-influencable material has been located next to the attachment of the tongue to the wheel suspension 11, so that the tongue 13 as a whole can swing away from the brake disk 12 when the material reacts to heat radiation from the disk.

In the variant according to FIG. 5, the tongue 13 as a whole consists of the heat-influencable material, so that in this case also the tongue 13 as a whole can swing away from the brake disk 12 when the material reacts to heat radiation from the disk.

Figure 6:
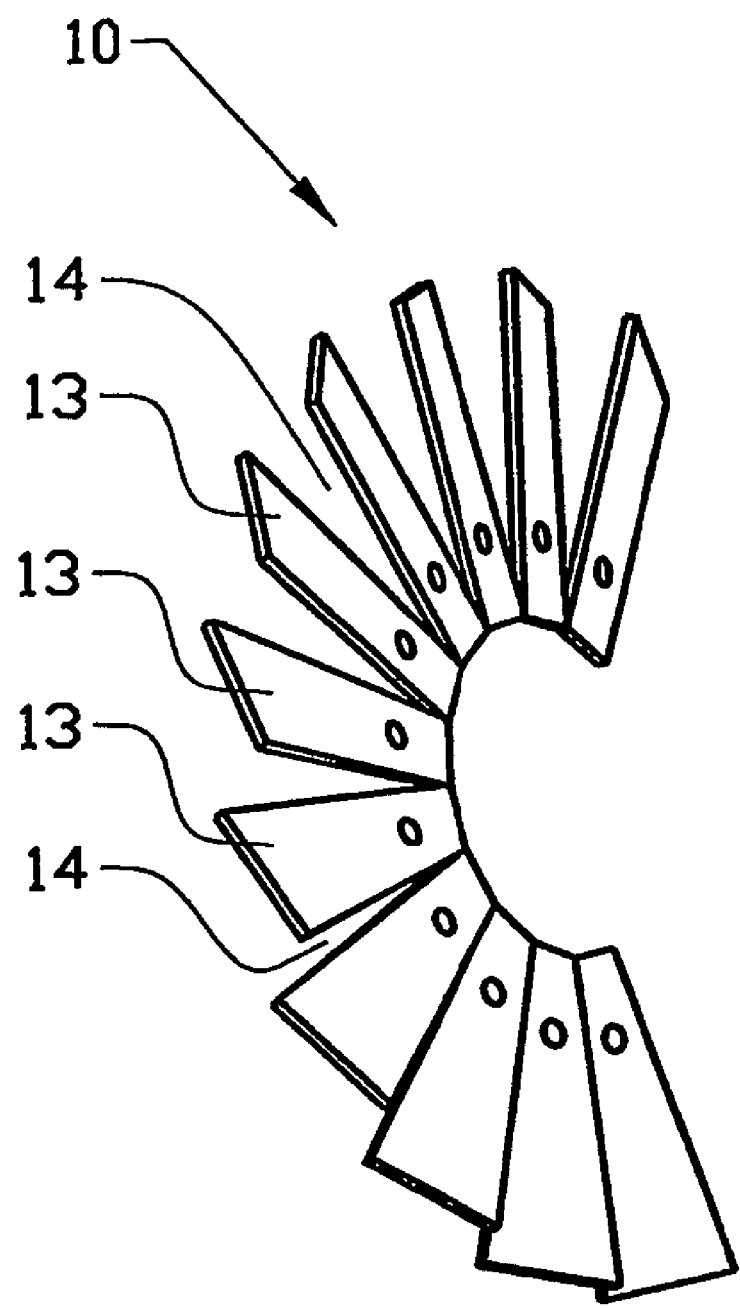
FIG. 6 is a perspective view of another variant of the illustrative embodiment shown in FIG. 2.

In the variant according to FIG. 6, the oblong tongues 13 are completely plane and located essentially in the same plane as the opening and are rotatable out of this plane about their longitudinal axis. In this case, the tongues 13 can be angled in such a way that they direct the air flow in toward the brake disk. In this case too, the tongues can be L-shaped when the periphery of the brake disk needs to be protected.

The invention is not to be regarded as being limited to the illustrative embodiments described above, but a number of further variants and modifications are conceivable within the scope of the following patent claims. For example, different types of means of attachment can be used for mounting tongues on the wheel suspension or for attaching the heat-influencable material to the protection device 10.

The invention claimed is:

1. A protection device (10) for protecting a brake disk (12) in a disk brake from dirt particles, the brake disk (12) having a pair of side surfaces and a radially outwardly facing edge surface disposed between the side surfaces, said protection device comprising:
    at least one protection means (13) configured to cover at least partly the edge surface of the brake disk for effectively preventing dirt particles and on-coming, travel generated wind from directly striking the brake disk (12) associated therewith when said protection means (13) is disposed in a first end position and configured to expose at least partly the edge surface of the brake disk for allowing relative wind to directly strike said brake disk (12) associated therewith when disposed in a second end position,
wherein said at least one protection means (13) is at least partly constructed from material that is shape-influenced by heat such that said at least one protection means (13) assumes said first end position when a temperature of said protection means (13) lies below a first temperature and assumes said second end position when said protection means (13) exceeds a second temperature, wherein said material that is shape-influenced by heat is disposed in an angle between two legs (13a, 13b) of said protection means (13), wherein said protection means (13) is L-shaped in section.

2. A protected vehicular disk brake arrangement shielded from contamination particles, said arrangement comprising:
    a contamination shield (13) mounted to a suspension of a carrying vehicle and surrounding an associated brake disk (12), the brake disk (12) having a pair of side surfaces and a radially outwardly facing edge surface disposed between the side surfaces, said shield being at least partly constructed from temperature reactive material characterized by being shape-influenced by heat produced by the associated brake disk (12) when performing a braking function and thereby varying an amount of cooling air supplied to the associated brake disk (12) in dependence upon brake temperature; and said contamination shield (13) having a closed configuration that at least partially covers the edge surface of the brake disk thereby precluding contamination particulate and on-coming, travel generated cooling air from directly striking the associated brake disk (12) and an open configuration that exposes at least partly the edge surface of the brake disk thereby allowing on-coming, travel generated cooling air to directly strike the associated brake disk (12), the closed configuration being assumed when a temperature of the contamination shield (13) lies below a first predetermined temperature and the open configuration being assumed when the temperature of the contamination shield (13) exceeds a second predetermined temperature, wherein the temperature reactive material is located in an angle between two legs (13*a*, 13*b*) of the said contamination means (13), wherein the contamination shield (13) is L-shaped in section.

* * * * *